June 3, 1930.	G. F. WIKLE	1,760,929
STITCHER FOR TIRE BUILDING MACHINES
Filed Sept. 28, 1928
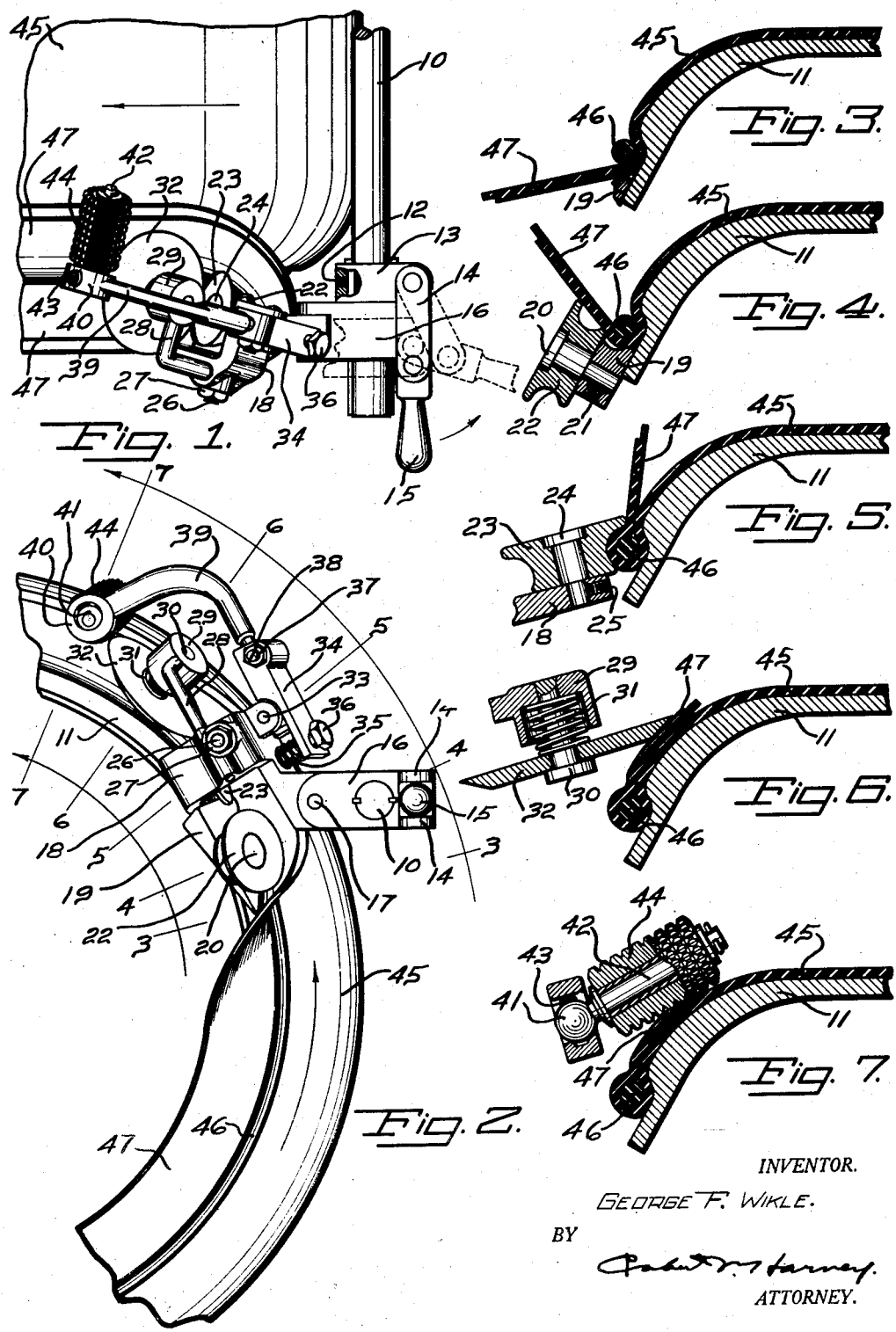
INVENTOR.
GEORGE F. WIKLE.
BY
ATTORNEY.

Patented June 3, 1930

1,760,929

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

STITCHER FOR TIRE-BUILDING MACHINES

Application filed September 28, 1928. Serial No. 309,095.

My invention relates to tire building machines and more particularly to a stitching attachment on machines of this character which use a crown type building drum and has for its object to provide an attachment which will turn upwardly over the bead and stitch into place certain of the carcass plies and other elements that are used in the fabrication of a tire carcass ready for vulcanization. Another object is to provide an attachment which will perform this operation in substantially one revolution of the drum and other objects will be apparent from the specification and claim.

In the drawings illustrating one embodiment of my invention,

Fig. 1 is a plan view showing my invention in operating position with a tire carcass on a crowned tire building drum;

Fig. 2 is a side view of the apparatus shown in Fig. 1; and

Figs. 3, 4, 5, 6, and 7 are sectional views on a larger scale taken respectively on the lines 3—3, 4—4, 5—5, 6—6, and 7—7 of Fig. 2.

This invention is an improvement on that described in my prior application Serial No. 226,534, filed October 7, 1927 for a tire building machine. Referring to the drawings, 10 represents a shaft positioned adjacent a tire building drum 11 which is supported by a housing, not shown in the drawings, which in turn encloses a driving unit to rotate the drum in the direction shown by the arrows in Figs. 1 and 2. The shaft 10 is also supported on the housing preferably in a manner as shown in my previously cited prior application. Adjustably secured to shaft 10 by set screw 12 is a collar 13 bearing links 14 which are in turn secured to a handle 15 pivotally mounted on a forked block 16 slidably mounted on shaft 10. As will be clear from Fig. 1 this arrangement serves to releasably lock the block 16 into a predetermined operating position as shown by the full line position and, as the handle 15 is moved as illustrated by the arrow and the dotted line position, the block 16 is moved away from the tire building drum 11 to an inoperative position.

Pivotally positioned, within small limits, at 17 to the forked block 16 is a supporting frame 18 one portion of which is formed into a plow 19 on which is mounted, by the use of a stud 20 and a set screw 21, a roller 22 (Fig. 4). Another roller 23 is mounted on the frame 18 by a stud 24 and set screw 25 (Fig. 5). Adjustably mounted in the frame 18 by locking stud 26 and nut 27 is a rod 28 formed with an angle bend as shown and on the end of which is formed a spring retaining cap 29. A stud 30 which is riveted to the cap 29 serves to assemble a compression spring 31 and a beveled disk 32 as shown in Fig. 6. Pivotally mounted to the frame 18 at 33 (Figs. 1 and 2) is a rocking member 34, one end of which engages a compression spring 35 positioned on the frame 18 by bolt 36 which also acts as a stop. In the other end of the rocking member 34 is a locking stud 37 and a nut 38 serving to adjustably mount in the rocking member 34 an angle bracket 39 at the end of which is formed a collar 40 which is, as shown in Fig. 7, adapted to engage the ball shaped end 41 of a stud shaft 42. A set screw 43 locks the stud shaft 42 at any desired angle. Rotatably mounted on the stud shaft 42 is a roller 44, the surface of which is made up of blunt pyramid points.

In the drawings I have shown the first two plies as a unit 45 positioned on the building drum 11 and a bead 46 in place. The operation which the device of my invention is to perform is to turn over the extending portion 47 of the plies 45 around the bead 46 and stitch it into place. This is accomplished as follows. The supporting shaft 10 is brought into operating position and the handle 15 is manipulated to position the apparatus in operating relation with the tire carcass, the extending portion 47 of the plies 45 having been preferably turned around the bead 46 by hand at the point of initial contact to assure proper engagement. The building drum is then rotated one revolution in the direction of the arrows in Figs. 1 and 2. The function of each element operating on the carcass is shown in their order of operation in Figs. 3 to 7. The plow 19 starts the portion 47 of the plies 45 around the bead 46, the roller 22 carries it still further around the bead and also serves to reduce the friction between the plies and the plow, the roller 23 then compresses the plies into place around bead, the spring pressed disk 32 pushes and at the same time partially stitches the plies into place and finally the roller 44 completes the stitching. The pyramid point construction of the roller 44 eliminates any tendency of wrinkling and also has an improved stitching action.

As will be evident two of these units may be mounted on the shaft 10 so that both sides of the carcass may be operated upon at the same time and also by the use of the several adjustments the apparatus may be used on nearly all the variously shaped tire building drums.

Having thus described my invention, I claim:

A device of the character described comprising a plow mounted to be positioned in operative relation with a tire carcass supported on a building drum, a roller mounted on the plow, said plow and roller positioned to engage an edge of the carcass plies and turn said edge around the bead core of the carcass, a flanged roller mounted in fixed relation to the plow and adapted to stitch the carcass plies around the bead core, a rotatable spring-backed disk adjustably mounted in relation to the plow to position the turned-over edge of the carcass plies in place on the tire carcass and a yieldable pressure stitching roll adjustably mounted in relation to the plow and adapted to stitch down the said turned-over edge.

GEORGE F. WIKLE.